(12) United States Patent
Brücken et al.

(10) Patent No.: US 6,200,447 B1
(45) Date of Patent: Mar. 13, 2001

(54) ELECTRICALLY DEPOSITED COATING AGENT

(75) Inventors: Thomas Brücken; Günther Ott, both of Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/068,041

(22) PCT Filed: Nov. 6, 1996

(86) PCT No.: PCT/EP96/04835

§ 371 Date: May 13, 1998

§ 102(e) Date: May 13, 1998

(87) PCT Pub. No.: WO97/17408

PCT Pub. Date: May 15, 1997

(30) Foreign Application Priority Data

Nov. 6, 1995 (DE) .............................................. 195 41 230

(51) Int. Cl.$^7$ .................................................. C25D 13/00
(52) U.S. Cl. ............................................. 204/499; 501/502
(58) Field of Search ................................... 204/499, 501, 204/502

(56) References Cited

U.S. PATENT DOCUMENTS

| | | | |
|---|---|---|---|
| 3,169,945 | 2/1965 | Hostettler et al | 260/78.3 |
| 3,617,458 | 11/1971 | Brockmas | 204/181 |
| 3,640,926 | 2/1972 | Slater | 260/18 EP |
| 3,663,389 | 5/1972 | Koral et al. | 204/181 |
| 3,839,252 | 10/1974 | Bosso et al. | 260/29.2 |

FOREIGN PATENT DOCUMENTS

| | | |
|---|---|---|
| 27 01 002 C2 | 1/1977 | (DE) . |
| 35 18732 A1 | 5/1985 | (DE) . |
| 35 18770 A1 | 5/1985 | (DE) . |
| 36 30 667 C2 | 3/1987 | (DE) . |
| 0 004 090 B1 | 10/1981 | (EP) . |
| 0 059 468 | 3/1982 | (EP) . |
| 0 059 468 A1 | 3/1982 | (EP) . |
| 0 074 634 A2 | 9/1982 | (EP) . |
| 0 261 385 B1 | 4/1992 | (EP) . |

OTHER PUBLICATIONS

Machu, Electrodeposition coating, Verlag Chemie, 1974, pp. 67/68. No Month Available.

*Primary Examiner*—Kishor Mayekar

(57) ABSTRACT

The present invention relates to an electrodepositable coating composition comprising binders, pigments, fillers, corrosion protection inhibitors, paint auxiliaries, catalysts if desired, organic solvents and water, which additionally comprises an organic amine salt.

17 Claims, No Drawings

ELECTRICALLY DEPOSITED COATING AGENT

BACKGROUND OF THE INVENTION

The present invention relates to an electrodepositable coating composition based preferably on basic, thermally crosslinkable epoxy or polyurethane resins.

It is known to coat metallic articles by means of electrodeposition coating, use being made thereof both in the automotive industry and otherwise in the metal processing industry. The electrodeposition coating systems used for this purpose generally consist of an aqueous binder dispersion and a pigment paste.

Resins which are electrodepositable at the cathode are described, for example, in U.S. Pat. No. 3,617,458. These are crosslinkable coating materials which are deposited on the cathode. These coating materials are derived from an unsaturated polymer which comprises amine groups and carboxyl groups and from an epoxidized material.

U.S. Pat. No. 3,663,389 describes cationically electrodepositable compositions which are mixtures of certain amine-aldehyde condensates and a large number of cationic resinous materials, one of which materials can be prepared by reacting an organic polyepoxide with a secondary amine and solubilizing the product with acid.

U.S. Pat. No. 3,640,926 discloses aqueous dispersions which can be electrodeposited at the cathode and which consist of an epoxy resin ester, water and tertiary amino salts. The epoxy ester is the reaction product of glycidyl polyether and an unsaturated oleic acid. The amine salt is the reaction product of an aliphatic carboxylic acid and a tertiary amine.

Binders based on epoxy and polyurethane for use in binder dispersions and pigment pastes, moreover, are known in numerous embodiments. Reference may be made, for example, to DE-2701002, EP-A-261385, EP-A-004090 and DE-C 3630667.

For certain applications, the throwing power is inadequate with all of the systems known to date. In other words, the distribution of paint between readily accessible exterior surfaces and difficult-to-reach interior areas is inadequate. Hence, for example, economic coating of flat radiators requires complete coating of the cavities formed by convectors with, at the same time, thin coats on the exterior surfaces.

SUMMARY OF THE INVENTION

The object of the present invention, accordingly, is to provide an electrodepositable coating composition comprising binders, organic solvents and water and, if desired, pigments, fillers, corrosion protection inhibitors, paint auxiliaries and catalysts, which ensures better distribution of paint between readily accessible exterior surfaces and difficult-to-reach interior areas and, in particular, which improves the coating of cavities relative to the stated prior art.

This object is achieved in that the coating composition is obtainable by adding to it an organic amine salt or an ammonium salt of formic acid, acetic acid, propionic acid or lactic acid. which is not reactive with its principal binder.

DETAILED DESCRIPTION OF THE INVENTION

It is essential to the invention that the amine salts are present in unbound form in the coating bath and in the coating composition. Consequently, suitable such salts are only those which do not react with the binder, and especially not with the principal component of the binder. These include preferably low molecular mass amine salts according to the invention, especially monoamines. In accordance with the invention, very particular preference is given to amine salts having a number-average molecular mass distribution $M_n$ <500, most preferably $M_n$ <300.

As the amine it is possible, for example, to use triethylamine, n-butylamine, diisopropylamine; preference is given to alkanolamines, such as ethanolamine, N-methylethanolamine, diethanolamine, triethanolamine, for example. N,N-Dimethylethanolamine is particularly preferred.

In accordance with the invention the organic amine salt is preferably present in an amount of from 0.001 to 5% by weight, preferably from 1 to 3% by weight, in the coating bath. In a preferred embodiment, accordingly, the electrodepositable coating composition consists of from 30 to 60% by weight, preferably from 34 to 40% by weight of binder, from 0.001 to 5% by weight, preferably from 1 to 3% by weight of a formulation of an organic amine salt (as described below), from 7 to 15% by weight, preferably from 8 to 10% by weight of pigment and from 20 to 62% by weight, preferably from 47 to 57% by weight of water, corrosion inhibitors, paint auxiliaries, organic solvents and, if desired, catalysts.

In the binder systems of the invention, the amine salts mentioned are judiciously in the form of an aqueous amine salt solution which is prepared by the neutralization reaction between an organic amine and an organic acid in fully deionized water. The amounts of the starting materials are chosen such that the solution has a pH of <7, preferably from 5 to 6.

As the organic acid it is possible, for example, to employ formic acid, acetic acid, propionic acid or lactic acid. Acetic acid and lactic acid are preferred.

In accordance with the invention, these salt solutions are stirred into the binder dispersion or into the electrodeposition coating bath. To prevent coagulation phenomena the content of amine salt in the aqueous amine salt solution should be below 70%. Contents of less than 40% are preferred, with particular preference less than 25%.

The described addition of amine salts and the presence of amine salts in unbound form in the coating bath, and the effects associated therewith, are therefore particularly surprising since to date care has always been taken to ensure complete reaction of the amine components. The skilled worker proceeded, indeed, on the assumption that the throwing power falls with increasing concentration of amine (cf. e.g. Machu, Elektrotauchlackierung [Electrodeposition coating], Verlag Chemie, 1974, page 67/68).

The coating composition which is electrodepositable in accordance with the invention, to which the described amine salts are added, preferably comprises resins which are electrodepositable at the cathode. For this purpose it is possible in principle to consider all cathodically depositable, externally crosslinking or self-crosslinking synthetic resins which are suitable for the preparation of electrodeposition coating baths. The resins preferably comprise binders based on polyurethane resins or epoxy resins, which may have been prepared by reaction with basic amino compounds.

In one preferred embodiment the electrodeposition coating composition comprises from 55 to 95% by weight, based on the overall amount of the binder, of an organic synthetic-resin binder which comprises primary and/or secondary and, if desired, also tertiary amino groups and has an average molecular weight (Mn) of from about 500 to 10,000, a pkb of from about 3 to 7.0, preferably from 3 to 5.5 and, with particular preference, from 3.5 to 6, and an amine number of from about 30 to 150, and from 5 to 45% by weight of a crosslinking agent having an average molecular weight (Mn) of from about 500 to 5000.

Preference is given in accordance with the invention to the electrodeposition coating baths which comprise cationic, amine-modified epoxy resins as cathodically depositable synthetic resins. Both self and externally crosslinking amine-modified epoxy resins are known. Preference is given to the use of externally crosslinking amine-modified epoxy resins.

By amine-modified epoxy resins are meant cationic reaction products of (A) optionally modified polyepoxides, (B) primary and/or secondary amines and/or their salts and/or salts of tertiary amines and, if desired, (C) polyols, polycarboxylic acids, polyamines or polysulfides.

By polyepoxides are meant compounds which comprise two or more epoxide groups in the molecule. or preparing the amine-modified epoxy resins, compounds suitable as component (A) are all those which comprise two or more epoxide groups in the molecule. Preference is given to those compounds which comprise two epoxide groups in the molecule.

Particularly preferred (A) components are compounds which can be prepared by reacting (a) a diepoxide compound, or a mixture of diepoxide compounds, having an epoxide equivalent weight of below 2000 with (b) a compound which under the given reaction conditions reacts monofunctionally with respect to epoxide groups, and which comprises a phenol group or thiol group, or a mixture of such compounds, where components (a) and (b) are employed in a molar ratio of from 10:1 to 1:1, preferably from 4:1 to 1.5:1, and the reaction of component (a) with component (b) is conducted at from 100 to 190° C. in the absence or presence of a catalyst (cf. DE-A-35 18 770).

Further particularly preferred (A) components are compounds which can be prepared by the polyaddition—conducted at from 100 to 195° C. in the absence or presence of a catalyst and initiated by a monofunctionally reacting initiator which carries alternatively an alcoholic OH group, a phenolic OH group or an SH group—of a diepoxide compound and/or of a mixture of diepoxide compounds, alone or together with at least one monoepoxide compound, to give an epoxy resin in which diepoxide compound and initiator are incorporated in a molar ratio of more than 2:1 to 10:1 (cf. DE-A-35 18 732).

Polyepoxides which can be employed for preparing the particularly preferred (A) components and which can also be employed themselves as (A) components are poly-glycidyl ethers of polyphenols, which are prepared from polyphenols and epihalohydrins. As polyphenols it is possible, for example, with very particular preference to employ bisphenol A and bisphenol F. In addition, 4,4'-dihydroxybenzophenone, 1,1-bis(4-hydroxyphenol)-ethane, 1,1-bis(4-hydroxyphenyl)isobutane, 2,2-bis(4-hydroxytertiary-butylphenol)propane, bis(2-hydroxy-naphthyl)methane, 1,5-dihydroxynaphthalene and phenolic novolak resins are also suitable.

Further suitable polyepoxides are polyglycidyl ethers of polyhydric alcohols such as, for example, ethylene glycol, diethylene glycol, triethylene glycol, 1,2-propylene glycol, 1,4-propylene glycol, 1,5-pentane-diol, 1,2,6-hexanetriol, glycerol and 2,2-bis(4-hydroxy-cyclohexyl)propane.

It is also possible to employ polyglycidyl esters of polycarboxylic acids such as, for example, oxalic acid, succinic acid, glutaric acid, terephthalic acid, 2,6-naphthalenedicarboxylic acid, dimerized linoleic acid. Typical examples are glycidyl adipate and lycidyl phthalate.

Also suitable are hydantoin epoxides, epoxidized polybutadiene and polyepoxide compounds, which are obtained by epoxidizing an olefinically unsaturated aliphatic compound.

By modified polyepoxides are meant polyepoxides in which some of the reactive groups have been reacted with a modifying compound.

Examples of modifying compounds are:

a) carboxyl-containing compounds such as saturated or unsaturated monocarboxylic acids (e.g. benzoic acid, linseed oil fatty acid, 2-ethylhexanoic acid, Versatic acid), aliphatic, cycloaliphatic and/or aromatic dicarboxylic acids of various chain length (e.g. adipic acid, sebacic acid, iso-phthalic acid or dimeric fatty acids), hydroxy-alkylcarboxylic acids (e.g. lactic acid, dimethylolpropionic acid), and carboxyl-containing polyesters, or b) amino-containing compounds such as diethylamine or ethylhexylamine or diamines having secondary amino groups, e.g. N,N'-dialkylalkylenediamines such as dimethylethylenediamine, N,N'-dialkylpolyoxyalkylenamines such as N,N'-dimethylpolyoxypropylenediamine, cyanoalkylated alkylenediamines such as bis-N,N'-cyanoethyl-ethylenediamine, cyanoalkylated polyoxyalkylenamines such as bis-N,N'-cyanoethyl-polyoxypropylenediamine, polyamino amides such as e.g. Versamides, especially terminal amino-containing reaction products of diamines (e.g. hexamethylenediamine), polycarboxylic acids, especially dimeric fatty acids, and monocarboxylic acids, especially fatty acids, or the reaction product of one mole of diaminohexane with two moles of monoglycidyl ether or monoglycidyl ester, especially glycidyl esters of ($\alpha$-branched fatty acids, such as Versatic acid, or c) hydroxyl-containing compounds such as neopentyl glycol, bis-ethoxylated neopentyl glycol. Neopentyl glycol hydroxypivalate, dimethyl-hydantoin-N,N'-diethanol, 1,6-hexanediol, 2,5-hexanediol, 1,4-bis(hydroxymethyl)cyclohexane, 1,1-isopropylidenebis(p-phenoxy)-2-propanol, tri-methylolpropane, pentaerythritol or amino alcohols such as triethanolamine, methyldiethanolamine or hydroxyl-containing alkyl ketimines, such as aminomethyl-1,3-propanediol methyl isobutyl ketimine or tris(hydroxymethyl) aminomethane cyclohexanone ketimine, and also polyglycol ethers, polyester polyols, polyether polyols, polycaprolactone polyols, polycaprolactam polyols of various functionality and molecular weights, or d) saturated or unsaturated fatty acid methyl esters, which are reacted in the presence of sodium methylate with hydroxyl groups of the epoxy resins.

As component (B) it is possible to use primary and/or secondary amines and/or their salts and/or salts of tertiary amines, the secondary amines being particularly preferred components (B).

The amine should preferably be a water-soluble compound. Examples of such amines are mono- and dialkylamines, such as methylamine, ethylamine, propylamine, butylamine, dimethylamine, diethylamine, dipropylamine, methylbutylamine and the like. Likewise suitable are alkanolamines, such as methylethanolamine, diethanolamine and the like, for example. Dialkylaminoalkylamines, furthermore, such as dimethylaminoethylamine, diethylaminopropylamine, dimethylaminopropylamine and the like, for example, are suitable. In the majority of cases use is made of low molecular mass amines, although it is also possible to employ monoamines of higher molecular mass.

Polyamines having primary and secondary amino groups can be reacted in the form of their ketimines with the epoxide groups. The ketimines are prepared from the polyamines in a known manner.

The amines may also comprise further groups, although these should not disrupt the reaction of the amine with the epoxide group and should also not lead to gelling of the reaction mixture.

The charges required for dilutability in water and electrical deposition can be generated by protonation with water-soluble acids (e.g., boric acid, formic acid, lactic acid, preferably acetic acid) or else by reacting the oxirane groups with salts of an amine.

As the salt of an amine it is possible to use the salt of a tertiary amine.

The amine component of the amine-acid salt is an amine which can be unsubstituted or substituted, as in the case of hydroxylamine, in which case these substituents should not disrupt the reaction of the amine-acid salt with the polyepoxide, and the reaction mixture should not gel. Preferred amines are tertiary amines, such as dimethylethanolamine, triethylamine, trimethylamine, triisopropylamine and the like. Examples of other suitable amines are given in U.S. Pat. No. 3,839,252 in column 5, line 3 to column 7, line 42.

As component (C) use is made of polyols, polycarboxylic acids, polyamines or polysulfides and/or mixtures of compounds from these classes of substance.

The appropriate polyols include diols, triols and higher polymeric polyols, such as polyester polyols, polyether polyols.

Polyalkylene ether polyols which are suitable for component (C) correspond to the general formula H—[O—(CHR)$_n$]$_m$—OH in which R=hydrogen or a lower alkyl radical, with or without various substituents, n=2 to 6 and m=3 to 50 or even higher. Examples are poly(oxytetramethylene) glycols and poly(oxyethylene) glycols and also poly-(oxypropylene) glycols.

If polyether polyols which are obtainable by reacting a cyclic polyol, such as bisphenol A, for example, with ethylene oxide or with a mixture of ethylene oxide with an alkylene oxide which contains 3 to 8 carbon atoms are employed as component (C), then with particular preference cationic, amine-modified epoxy resins are obtained (cf. EP-A-74634).

Polyester polyols can likewise be used as the polymeric polyol component. The polyester polyols can be prepared by polyesterifying organic polycarboxylic acids or their anhydrides with organic polyols which comprise primary hydroxyl groups. Normally, the polycarboxylic acids and polyols are aliphatic or aromatic dicarboxylic acids and diols.

The diols used to prepare the polyesters include alkylene glycols, such as ethylene glycol, butylene glycol, neopentyl glycol and other glycols, such as cyclohexanedimethanol.

The acid component of the polyester consists primarily of low molecular mass carboxylic acids or their anhydrides having 2 to 18 carbon atoms in the molecule. Examples of suitable acids are phthalic acid, isophthalic acid, terephthalic acid, tetrahydrophthalic acid, hexahydrophthalic acid, adipic acid, azelaic acid, sebacic acid, maleic acid and glutaric acid. Instead of these acids it is also possible to use their anhydrides where they exist.

Polyester polyols which are derived from lactones can also be utilized, furthermore, as component (C). These products are obtained by the reaction of an ε-capro-lactone with a polyol. Such products are described in U.S. Pat. No. 3,169,945.

The polylactone polyols which are obtained by this reaction are notable for the presence of a terminal hydroxyl group and for repeating polyester units which are derived from the lactone. These repeating molecular units can correspond to the formula

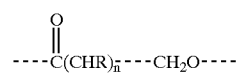

in which n is at least 4, preferably from 4 to 6, and the substituent is hydrogen, an alkyl radical, a cyclo-alkyl radical or an alkoxy radical.

As component (C) it is also possible to employ aliphatic and/or alicyclic polyfunctional alcohols or carboxylic acids having a molecular weight of below 350. These advantageously have a branched aliphatic chain, in particular with at least one neo structure.

Suitable compounds correspond to the following general form

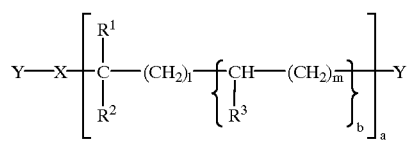

| Herein: | |
| --- | --- |
| Y = OH, COOH | a = 0; 1 |
| X = (CH$_2$)$_n$ | b = 0; 1 |
| | l = 0 – 10 |
| | m, n = 1 – 10 |

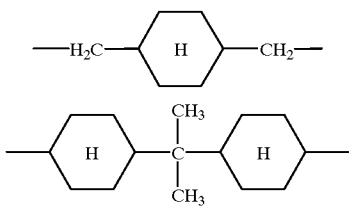

R$^1$ R$^2$ R$^3$ =H, alkyl radical having 1 to 5 carbon atoms.

As examples there may be mentioned: diols, such as ethylene glycol, diglycol, dipropylene glycol, dibutylene glycol, triglycol, 1,2-propanediol, 1,3-propanediol, 2,2-dimethyl-1,3-propanediol, 2,2-diethyl-1,3-propane-diol, 2-methyl-2-ethyl-1,3-propanediol, 2-methyl-2-propyl-1,3-propanediol, 2-ethyl-2-butyl-1,3-propane-diol, 1,2- butanediol, 1,4-butanediol, 2,3-butanediol, 2-ethyl 1,4-butanediol, 2,2-diethyl-1,3-butanediol, but-2-ene-1,4-diol, 1,2-pentanediol, 1,5-pentanediol, 3-methyl-1,5-pentanediol, 1,6-hexanediol, 2,5-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3hydroxypropyl, 2,2-dimethylhydroxypropionate, 2-methyl-2-propyl-3-hydroxy-propyl 2-methyl-2-propylhydroxypropionate, 4,4'-methyl-enebiscyclohexanol and 4,4'-isopropylidenebiscyclohexanol hexanol. Some preferred diols are 2,2-dimethyl-1,3 propanediol, 3-methyl-1,5-pentanediol, 2,2-dimethyl-3-hydroxy-propyl 2,2-dimethylhydroxypropionate and 4,4'-isopropylidenebiscyclohexanol.

A large number of dicarboxylic acids are suitable as carboxylic acids, such as oxalic acid, malonic acid, 2,2-dimethylmalonic acid, succinic acid, glutaric acid, adipic acid, hexahydrophthalic acid, maleic acid, fumaric acid, pimelic acid, suberic acid, azelaic acid, sebacic acid, itaconic acid, citraconic acid and mesaconic acid.

Dicarboxylic acids preferably employed are, for example, 2,2-dimethylmalonic acid and hexahydrophthalic acid.

It is also possible to employ long-chain dicarboxylic acids as component (C). Examples thereof are dimeric fatty acids, such as dimeric linoleic acid, for instance.

Polyamines suitable as component (C) can be prepared, for example, by reacting primary diamines and monoepoxides, The secondary substituted diamines formed modify the epoxy resins in a suitable manner.

As component (C) it is also possible to use primary-tertiary diamines or alkanolamines such as aminoethanol or aminopropanol.

Suitable polyfunctional SH compounds are reaction products of organic dihalides with sodium polysulfide, Further SH compounds are, for example, reaction products of hydroxyl-containing linear polyesters, polyethers or polyurethanes with mercaptocarboxylic acids such as mercaptoacetic acid, 2-mercaptopropionic acid; 3-mercaptopropionic acid, mercaptobutyric acid and the like.

Very particularly preferred electrodeposition coating baths are obtained if the cationic, amine-modified epoxy resins employed are reaction products of (A) polyepoxides, (B) primary and/or secondary amines and/or their salts and/or salts of tertiary amines, and (C) polyols, especially polyester- and/or polyether polyols.

The amine-modified epoxy resins can be employed both as externally crosslinking synthetic resins and as self-crosslinking synthetic resins, Self-crosslinking amine-modified epoxy resins can be obtained, for example, by chemical modification of the amine-modified epoxy resins. A self-crosslinking system can be obtained, for example, by reacting the amine-modified epoxy resin with a partially blocked polyisocyanate which possesses on average one free isocyanate group per molecule and whose blocked isocyanate groups are unblocked only at elevated temperatures.

The synthetic-resin binder can be employed either alone or as a mixture of two or more types with the associated crosslinking agent. For example, for harmonizing the mechanical and electrical properties it may be necessary to mix, say, an amino-containing epoxyamine resin with a polyaminoamide resin.

Preferred coating materials are obtained when externally crosslinking amine-modified epoxy resins are employed in combination with an appropriate crosslinking agent.

Examples of suitable crosslinking agents are phenolic resins, polyfunctional Mannich bases, melamine resins, benzoguanamine resins, blocked polyisocyanates and compounds which comprise at least two groups of the general formula $R^1$—O—CO—.

The radical $R^1$ denotes:

$R^1=R^2$—O—CO—$CH_2$—, $R^3$—CHOH—$CH_2$—, $R^4$—$CHOR^5$—CHOH—$CH_2$—

$R^2$=alkyl $R^3$=H, alkyl, $R^6$—O—$CH_2$—or $R^6$—CO—O—$CH_2$—

$R^4$=H or alkyl $R^5$=H, alkyl or aryl $R^6$=alkyl, cycloalkyl or aryl

Preferred electrodeposition coating baths are obtained if the crosslinking agents employed are blocked polyisocyanates and/or compounds which comprise at least two groups of the general formula $R^1$—O—CO—.

As blocked polyisocyanates it is possible to utilize any desired polyisocyanates in which the isocyanate groups have been reacted with a compound so that the blocked polyisocyanate formed is resistant to hydroxyl and amino groups at room temperature and yet reacts at elevated temperatures, in general in the range from about 90° C. to about 300° C. In preparing the blocked polyisocyanates it is possible to use any desired organic polyisocyanates suitable for crosslinking. Preference is given to the isocyanates which contain from about 3 to 36, in particular from about 8 to about 15 carbon atoms. Examples of suitable diisocyanates are hexamethylene diisocyanate, 2,4-tolylene diisocyanate, 2,6-tolylene diisocyanate and 1-isocyanatomethyl-5-isocyanato-1,3,3-trimethylcyclohexane. It is also possible to use polyisocyanates of higher isocyanate functionality. Examples of these are trimerized hexa-methylene diisocyanate and trimerized isophorone diisocyanate. Mixtures of polyisocyanates can also be utilized, furthermore, The organic polyisocyanates which come into consideration as crosslinking agents in the invention can also be prepolymers which are derived, for example, from a polyol, including a poly-ether polyol or a polyester polyol.

For the blocking of the polyisocyanates it is possible to use any desired suitable aliphatic, cycloaliphatic or aromatic alkyl monoalcohols, Examples thereof are aliphatic alcohols, such as methyl, ethyl, chloroethyl, propyl, butyl, amyl, hexyl, heptyl, octyl, nonyl, 3,3,5-trimethylhexyl, decyl and lauryl alcohol; cycloaliphatic alcohols, such as cyclopentanol and cyclohexanol; aromatic alkyl alcohols, such as phenyl carbinol and methylphenyl carbinol. Also suitable are ethoxylation or propoxylation products of the said alcohols. Examples thereof are butyl glycol, butyl diglycol and also propylene glycol methyl ether.

Other suitable blocking agents are hydroxylamines, such as ethanolamine, oximes, such as methyl ethyl ketone oxime, acetone oxime and cyclohexanone oxime, or amines, such as dibutylamine and diisopropylamine. These polyisocyanates and blocking agents can also be used, in appropriate proportions, to prepare the above-mentioned partially blocked polyisocyanates.

Examples of compounds which comprise at least two groups of the general formula $R^1$—O—CO— are bis (carbalkoxymethyl) azelate, bis(carbalkoxymethyl) sebacate, bis(carbalkoxymethyl) adipate, bis (carbalkoxymethyl) decanoate, bis(carbalkoxymethyl) terephthalate, bis(2-hydroxybutyl) acetate and bis(2-hydroxyethyl) terephthalate.

The crosslinking agent is generally employed in an amount of from 5 to 60% by weight, preferably from 20 to 40% by weight, based on the amine-modified epoxy resin. The amounts relate to the solids contents.

The coating materials in question can be a homo- or copolymer of an alkyl vinyl ether of the general formula $CH_2=CH-O-R$, where R represents an alkyl adical having 2 to 4 carbon atoms.

Homo- and/or copolymers of this kind are prepared by polymerizing an alkyl vinyl ether alone or together with further copolymerizable monomers, The polymerization takes place by well-known methods, preferably cationically.

It is possible, for example, to employ the homo- and/or copolymers which are obtainable by polymerizing from 80 to 100% by weight of an alkyl vinyl ether of the general formula $CH_2=CH-O-R$, where R represents an alkyl radical having 2 to 4 carbon atoms, preferably an ethyl radical, alone or together with up to 20% by weight of a copolymerizable monomer and/or of a copolymerizable monomer mixture.

The average molecular weight (weight average) of the resulting polymers should lie within the range from $5 \times 10^2$ to $1 \times 10^5$ g/mol, preferably in the range from $1 \times 10^3$ to $5 \times 10^4$ g/mol.

The abovementioned average molecular weight can be determined, for example, by gel permeation chromatography under the following conditions, for example:

Column type: two columns with a crosslinked polymer based on styrene and divinylbenzene as column material (PL-Gel 5 $\mu$ mixed columns, manufacturer: Polymer Laboratories) with PL precolumn; dimensions of the two first-mentioned columns: 300×7.5 mm.

Detector type: RI (refraction index) detector, Knauer differential refractometer, stage 8

Mobile phase: tetrahydrofuran

Sample concentration: about 2% strength in tetrahydrofuran

Injected sample volume: 50 $\mu l$

Sample flow rate: 0.8 ml/min

Calibration: 10 polystyrene standards of known molecular mass of from about 600 to 400,000, construction of the calibration plots by means of linear regression, Alkyl vinyl ether monomers which are employed with preference are ethyl and (iso)propyl vinyl ether; for example, ethyl vinyl ether and/or its homopolymers are employed.

Examples of monomers which can be copolymerized with alkyl vinyl ethers are styrene and alkyl (meth)acrylates such as, for example, ethyl (meth)acrylate and methyl (meth)acrylate.

There are a number of possibilities for incorporating the alkyl vinyl ether homo- or copolymers into coating materials. The alkyl vinyl ether homo- or copolymers are preferably incorporated into the pigment paste or into the organic synthetic resin solution or dispersion. In this context it may be advantageous to partially dissolve the polymers concerned in an appropriate solvent (e.g. butanol, ethyl acetate, butyl glycol, methyl isobutyl ketone or white spirit). In some cases it may be useful to use emulsifiers as well.

Viewed in principle, the alkyl vinyl ether homo- or copolymers can be incorporated into the electrodeposition coating baths at any point in time in the preparation and also after the production of the coating materials.

The alkyl vinyl ether homo- or copolymers can be incorporated into the coating materials of the invention in amounts such that these coating materials preferably comprise from 10 to 10,000 ppm, with particular preference from 100 to 1500 ppm. and, with very particular preference, from 150 to 500 ppm. of the alkyl vinyl ether homo- or copolymer (the indication ppm.—parts per million—is based on parts by weight).

It is of course also possible to employ mixtures of different alkyl vinyl ether homo- or copolymers. By means of the stated alkyl vinyl ether polymers it is possible to achieve heightened resistance to oil contamination craters in the electrodeposition coating bath.

It is possible, moreover, in order to balance out the performance properties, to a minor extent to incorporate, by emulsification, further modifying resins—in addition to the crosslinking agents described—into the cathodically depositable binders. As such resins it is possible to use styrene-allyl alcohol copolymers, OH-containing acrylic copolymers, blocked isocyanates, and also amine- and phenol-formaldehyde resins.

The water-solubility is obtained by forming salts from the amino-containing resins with acidic compounds. Suitable examples of the latter are acetic acid, lactic acid, formic acid, propionic acid, etc. Water-dilutable cationic resins which are used as binders can be prepared by adding to the basic resin from 0.2 to 1.2 equivalents, preferably from 0.4 to 1.0 equivalents of the protonated acid, based on the basic nitrogen atom in the resin, and stirring the mixture thoroughly at temperatures from about 20 to 90° C. Disruptive solvents entrained from the preparation of the resins are distilled off in vacuo. In order to reduce the viscosity, to regulate the deposition voltage and to improve the leveling, the coating composition may comprise up to approximately 3% by weight of organic solvents. It is possible in this context to use water-soluble solvents, such as alcohols, glycol ethers, keto alcohols or small proportions of water-insoluble solvents, such as hydrocarbons of various chain length. The aim is for as low as possible a content of organic solvents.

In the coating compositions of the invention it is possible to use the pigments which are known per se. In other words, both inorganic and organic pigments are employed. Thus white pigments (e.g. titanium dioxide), black pigments (e.g. magnesite, triiron tetroxide), color pigments (e.g. iron oxide, chromium oxide), reflective metal pigments (e.g. aluminum bronzes) or anticorrosion pigments can be employed. Examples of organic pigments to be mentioned are azo, triphenylmethane, carbonyl and dioxazine pigments.

The pigments are preferably incorporated in the form of a pigment paste into the aqueous dispersion of the resins.

The preparation of pigment pastes is common knowledge and need not be elucidated further here (cf. D. H. Parker, Principles of Surface Coating Technology, Intersience Publishers, New York (1965); R. L. Yates, Electropainting, Robert Draper Ltd., Teddington/England (1966); H. F. Payne, Organic Coating Technology, Volume 2, Wiley and Sons, New York (1961)).

The cationic, amine-modified epoxy resins described above are suitable for preparing the pigment pastes. It is also possible, however, to use, for example, epoxyamine adducts containing quaternary ammonium groups. In addition to the pigments the pigment paste may also comprise plasticizers, fillers, wetting agents, etc.

The pigment paste is added to the aqueous dispersion of the synthetic resin in an amount such that the finished coating material has the properties required for deposition. In the majority of cases the weight ratio between pigment and synthetic resin is from 0.05 to 0.5.

Also employed in the coating compositions are the fillers which are known to the skilled worker. These include, inter alia, silicatic fillers (e.g. aluminum silicate, talc, siliceous earth, micaceous iron ore, silicon carbide, quartz flour, kieselguhr) and sulfatic fillers (e.g. barium sulfate, calcium sulfate).

Finally, there are customary paint auxiliaries in the coating compositions, examples being plasticizers and other paint additives (e.g. dispersing aids, emulsifiers), thickeners and thixotropic agents, foam inhibitors, leveling agents and other aids against surface defects, stabilizers and/or UV absorbers.

The preparation of pigment pastes is common knowledge and need not be elucidated further here. (Cf. D. H. Parker, Principles of Surface Coating Technology, Intersience Publishers, New York (1965); R. L. Yates, Electropainting, Robert Draper Ltd., Teddington/England (1966); H. F. Payne, Organic Coating Technology, Volume 2, Wiley and Sons, New York (1961).

The coating composition of the invention can be deposited on all electrically conductive substrates preferably on metals. Owing to the improved throwing power it is particularly suitable for the coating of radiators.

For the coating of substrates, the electrodeposition coating bath is brought into contact with an electrically conducting anode and with the electrically conductive substrate which is connected as the cathode. When electrical current passes between anode and cathode, a firmly adhering coating film is deposited on the cathode.

In the process for coating the electrically conductive substrates, accordingly, the procedure is, for example, as follows:
  (1) the substrate is immersed in an aqueous electrodeposition coating bath which comprises at least one cathodically depositable synthetic resin,
  (2) the substrate is con nected as cathode,
  (3) by means of direct current a film is deposited on the substrate,
  (4) the substrate is removed from the electrodeposition coating m aterial, and
  (5) the deposited coating film is stoved.

Electrically conductive and non-corroding electrodes, for example, made from stainless steel or graphite, for example, are used as the anode. The article which is to be cathodically coated, and the anode, are dipped into an aqueous bath in the same way as known to date for electrophoretic deposition. During deposition, the bath is held judiciously at temperatures from 15 to 35, preferably from 20 to 30° C. Solids, deposition temperature, deposition time and voltage are chosen so that the desired coat thickness is obtained on the metal sheet after rinsing and stoving.

The solids content of the deposition bath, in which the c oating composition of the invention is present in dilute form, is, following dilution with water, judiciously from 5 to 30% by weight, preferably from 10 to 20% by weight. The pH of the bath is generally below 7, preferably between 5.5 and 6.8.

The voltage applied may vary within a wide range and can, for example, be between two and a thousand volts. It is nowadays common to operate with voltages between 50 and 500 volts. Surprisingly, however, it is possible when using the amine salts which are preferred in accordance with the invention to operate with very low voltages. The current density is generally between 10 and 100 amp./m$^2$. In the course of deposition the current density remains to fall off.

Following deposition, the coated article is rinsed off and is ready for stoving.

In the text below the invention is described in more detail with reference to the examples:

EXAMPLES

1. Preparing a Crosslinker 2440 parts of triisocyanuratized hexamethylene diisocyanate are charged under nitrogen to an appropriate reaction vessel and are diluted with 850 parts of methyl isobutyl ketone (MIBK). The mixture is heated to 50° C., and 1560 parts of di-n-butylamine are run in at a rate such that the temperature can be held with external cooling at from 60 to 70° C. Following the end of the addition, the temperature is raised to 75° C., held for 1 h, and 150 parts of n-butanol are added. The isocyanate equivalent and the amine equivalent lies in each case above 20,000. The solids content of the product is 79.6% (1 h at 130° C.).

2. Preparing an Aqueous Binder Dispersion 1

In a laboratory reactor which is heated with heat transfer oil and fitted with stirrer, reflux condenser, thermometer and inert gas inlet pipe, 1960 parts of a customary commercial epoxy resin based on bisphenol A and having an equivalent weight of 490 (Epikote 1001, company Shell) are melted at 125° C. in the presence of 220 parts of nonylphenol and 111 parts of xylene. When the melt is clear, traces of adhering moisture are removed in circulation via a water separator by azeotropic distillation, by applying a vacuum, for 20 minutes. Then 3.5 parts of N,N-dimethylbenzylamine are added and the reaction is led at 130° C. to an epoxide equivalent weight (EEW) of 1080. It is then cooled and, while cooling, is diluted with 142 parts of butyl glycol, and 254 parts of xylene. At 90° C., 147 parts of diethanolamine are added and the mixture is reacted for 1 hour. It is subsequently diluted with 107 parts of propylene glycol phenyl ether and 400 parts of isobutanol, and cooled further. At 70° C., 46 parts of N,N-dimethylaminopropylamine are added, and the mixture is heated to 90° C. and held at this temperature for 2 hours. The resin has a solids content of 70% and a viscosity of 3.8 dPas (40% strength in propylene glycol methyl ether; plate-cone viscometer at 23° C.).

It is subsequently cooled to 60° C. and admixed with 34 parts Plastilit 3060 (plasticizer, company BASF) and 1271 parts of the crosslinker described in Example 1. The mixture is transferred to a dispersing vessel to which 83 parts of glacial acetic acid, 1994 [lacuna] of fully deionized water and 7 parts of a defoamer solution (Surfynol 104; Air Products; 50% strength solution in butyl glycol) have been charged, and is dispersed with stirring. 15 minutes later it is diluted with a further 3814 parts of fully deionized water.

In a further step the dispersion is freed from volatile solvents in a vacuum distillation. The solvent removed is replaced i n equal quantities by fully deionized water. The dispersion has a solids content of 32.6% (1 h at 130° C.).

3. Preparing an Aqueous Binder Dispersion 2

In a laboratory reactor which is heated with heat transfer oil and fitted with stirrer, reflux condenser, thermometer and inert gas inlet pipe, 1095 parts of a customary commercial epoxy resin based on bisphenol A and having an epoxide equivalent weight of 188 together with 191 parts of dodecylphenol and 332 parts of bisphenol A are heated to 125° C. in the presence of 81 parts of xylene. When the melt is clear, 4.1 parts of N,N-dimethylbenzylamine are added and the reaction is led at 130° C. to an epoxide equivalent weight (EEW) of 1100. It is then cooled and, while cooling, is diluted with 126 parts of butyl glycol and 247 parts of secbutanol. At 105° C., 162 parts of a reaction product of 1 mol of diethylenetriamine and 2 mol of MIBK (70% strength in MIBK; having an amine equivalent of 124) and 66 parts of N-methylethanolamine are added and the mixture is reacted for 2 h at 110° C. The mixture is then cooled and diluted with 74 parts of Plastalit 3060, 51 parts of propylene glycol phenyl ether and 145 parts of sec-butanol. Subsequently, 926 parts of the crosslinker described under Example 1 are admixed and the resin mixture is transferred to a dispersing vessel to which 1320 parts of fully deionized water and 39 parts of glacial acetic acid have been charged. Following 15 minutes of homogenization, the mixture is diluted, while stirring, with a further 2245 parts of fully deionized water to a solids content of 33%. In a further step, the dispersion is freed from volatile solvents in a vacuum distillation. The organic phase of the distillate is discarded, while the aqueous phase is passed back into the dispersion. The dispersion has a solids content of 36.3% (1 h at 130° C.).

4. Preparing an Aqueous Grinding Resin

In a laboratory reactor which is heated with heat transfer oil and fitted with stirrer, reflux condenser, thermometer and inert gas inlet pipe, 991 parts of a customary commercial epoxy resin based on bisphenol A and having an epoxide equivalent weight of 188 are heated to 125° C. together with 173 parts of dodecylphenol and 300 parts of bisphenol A in the presence of 73 parts of xylene. When the melt is clear, 4.1 parts of N,N-dimethylbenzylamine are added and the reaction is led at 130° C. to an epoxide equivalent weight (EEW) of 1100. It is then cooled and, while cooling, is diluted with 156 parts of butyl glycol and 153 parts of sec-butanol. At 105° C., 147 parts of a reaction product of 1 mol of diethylenetriamine and 2 mol of MIBK (70% strength in MIBK with an amine equivalent of 124) and 55 parts of N-methylethanolamine are added and the mixture is reacted for 2 h at 110° C. Then, while cooling, it is admixed with a mixture of 1039 parts of fully deionized water and 29 parts of glacial acetic acid and is diluted, while stirring with a further 780 parts of fully deionized water. An aqueous resin solution of low viscosity with a solids content of 40.3% (1 h at 130° C.) is obtained.

5. Preparing an Aqueous Amine Salt Solution

In an open mixing vessel, 216 parts of N,N-dimethyl-ethanolamine (DMEA) and 1961 parts of fully deionized water are mixed, and 323 parts of 88% strength aqueous lactic acid are added with stirring. The solution heats up to about 50° C. It is stirred for a further 1 h and cooled to room temperature. The solution has a pH of 5.0. The DMEA lactate content is 20%.

6. Blending the Binder Dispersions with the Aqueous Amine Salt Solution

The binder dispersions are mixed with the DMEA lactate solution (Section 5) in the proportions by weight described below. For this purpose, in each case both components are cooled to <30° C. To avoid instances of precipitation the dispersion is stirred thoroughly, while the amine salt solution is run in slowly. The dispersions are subsequently filtered.

| Additive binder dispersion | Binder dispersion (parts by weight, type) | DMEA lactate soln. (parts by weight) |
|---|---|---|
| A | 5000 type 1 | 0 |
| B | 4881 type 1 | 119 |
| C | 5000 type 2 | 0 |
| D | 4767 type 2 | 233 |
| E | 4556 type 1 | 444 |

7. Preparing a Pigment Paste 0.5 parts of 90% strength acetic acid are added to 13.9 parts of fully deionized water. Subsequently, 35.4 parts of the grinding resin described under Section 4 are stirred in, and 48.2 parts of titanium dioxide rutile are added. The mixture is then made up with 2 parts of fully deionized water and is dispersed by way of a stirred mill until a fineness of less than 13 $\mu$m is reached. The paste thus prepared has a viscosity of from 1200 to 1600 mPas. Its viscosity is adjusted using acetic acid and fully deionized water.

8. Preparing an Electrodeposition Coating Bath 2050 g in each case of the binder dispersions A to E prepared under Section 6 are incorporated by dispersion with stirring into an initial charge of 2230 g of fully deionized water. Subsequently, with further stirring, 720 g of the pigment paste prepared under Section 7 are 10 weighed out and added.

These electrodeposition coating baths are stirred open at RT for 72 h.

The performance trials are subsequently conducted as follows.

9. Performance Trials

The electrodeposition coating baths prepared under Section 8 are introduced into a high vessel with the dimensions h: 350 mm×1: 150 mm×w: 100 mm. A graphite rod is immersed as the opposite electrode, and the coating material is kept in motion using a stirrer at a stirring speed of 700 rpm. Subsequently, two phosphatized metal panels of size 100 mm×300 mm are mounted in a frame such that the distance between the two panels is 4 mm and the frame seals off the two panels at the side. The panels prepared in this way are dipped into the electrodeposition coating material in such a way that 10 mm of the test panels are emersed bove the level of the bath.

The graphite anode is connected to the positive terminal and the two test panels, by means of a crocodile clip, to the negative terminal of a rectifier.

The coating bath is warmed up to a temperature of 28° C.

The test panels are then coated for 3 minutes at various deposition voltages. They are subsequently removed from the bath, taken out of the frame, rinsed with fully deionized water and stoved at 170° C. for 20 minutes.

Evaluation:

The extent of reach of the coating in cm is measured on the insides of the test panels; in other words, an assessment is made of how far coating material has been deposited from the bottom edge of the panels upward into the cavity formed by the two panels. The maximum possible extent of reach is therefore 29 cm, i.e. the depth of immersion of the panels. The coat thickness of the coating material generally decreases from bottom to top. The level at which the coat thickness is less than 5 $\mu$m is evaluated as the so-called 5 $\mu$m limit. In addition, the coat thickness is measured on the outside of the test panels.

| Table of results | | Standard | | | Standard | |
|---|---|---|---|---|---|---|
| | | bath A | bath B | bath C | bath D | bath E |
| Binder dispersion | | A | B | C | D | E |
| Bath solids | % | 20.7 | 21.6 | 21.4 | 22.3 | 20.8 |
| pH | | 5.9 | 5.7 | 6.45 | 6.67 | 6.65 |
| Pigment content of solids | % | 29.4 | 28.8 | 30.4 | 29.1 | 28.5 |
| Extent of throw 200V | cm | | | | | 27.5 |
| Coat thickness, exterior | $\mu$m | | | | | 7 |
| Extent of throw 250V | cm | 21.5 | 24.1 | 22 | 27.5 | 29 |
| Coat thickness, exterior | $\mu$m | 14.5 | 15 | 14 | 15 | 13 |
| Extent of throw 300V | cm | 23 | 26.5 | 24 | 29 | |

-continued

Table of results

| | | Standard bath A | bath B | Standard bath C | bath D | bath E |
|---|---|---|---|---|---|---|
| Coat thickness, exterior | μm | 18.5 | 20 | 19.5 | 22.7 | |

Summary:

As the content of amine salt increases it is possible to reduce the application voltage for equal extents of throw, which has as a consequence a thinner coat thickness externally and thus a more uniform distribution of coating material between exterior and interior. The practical advantage is that for articles with cavities which are difficult to coat recommends, in the case of radiator elements, a complete anticorrosive coating can be obtained with a lower consumption of coating material than in the case of the state of the art to date.

What is claimed is:

1. An electrodepositable coating composition comprising a cathodically depositable binder selected from acid salts of amino-containing resins, organic solvent, water, optionally one or more additives selected from the group consisting of pigments, fillers corrosion protection inhibitors, paint auxiliaries, catalysts, and mixtures thereof, and an organic amine salt which is not reactive with the binder or an ammonium salt of formic acid, acetic acid, propionic acid or lactic acid which is not reactive with the binder.

2. The electrodepositable coating composition of claim 1, wherein the organic amine salt which is not reactive with the binder has a low molecular mass.

3. The electrodepositable coating composition of claim 2, wherein the number-average molecular mass distribution of the amine salt $M_n$ is <500.

4. The electrodepositable coating composition of claim 3, wherein the number-average molecular mass distribution of the amine salt $M_n$ is <300.

5. The electrodepositable coating composition of clam 1, wherein the amine salt is prepared by reacting an organic amine selected from the group consisting of triethylamine, N,N-dimethylethanolamine, diisopropylamine, alkanolamines and mixtures thereof, with an organic acid selected from the group consisting of formic acid, acetic acid, propionic acid, lactic acid and mixtures thereof.

6. The electrodepositable coating composition of claim 5, wherein the amine salt is selected from the group consisting of N,N-dimethyl-N-(2-hydroxyethyl)ammonium acetate and N,N-dimethyl-N-(2-hydroxyethyl)ammonium lactate.

7. The electrodepositable coating composition of claim 1, comprising from 0.001 to 5% by weight of the organic amine salt.

8. The electrodepositable coating composition of claim 7, comprising from 1 to 3% by weight of the organic amine salt.

9. The electrodepositable coating composition of claim 1, wherein the binder comprises the reaction product of a resin selected from the group consisting of polyurethane resins, epoxy resins, and mixtures thereof, and one or more basic amino compounds.

10. The electrodepositable coating composition of claim 1, comprising
   a) from 30 to 60% by weight of the binder,
   b) from 0.001 to 5% by weight of the organic amine salt,
   c) from 7 to 15% by weight of one or more pigments, and
   d) from 20 to 62% by weight of water.

11. The electrodepositable coating composition of claim 10, comprising
   a) from 34 to 40% by weight of the binder,
   b) from 1 to 3% by weight of the organic amine salt,
   c) from 8 to 10% by weight of the one or more pigments, and
   d) from 47 to 57% by weight of water.

12. The electrodepositable coating composition of claim 1, having a pH below 7.

13. The electrodepositable coating composition of claim 12, having a pH between 5 and 6.8.

14. The electrodepositable coating composition of claim 1, to form a mixture and subsequently adding one or more pigments to the mixture.

15. The electrodepositable coating composition of claim 1, wherein the binder is selected from amine modified polyurethanes and amine modified epoxy resins.

16. A method of coating a substrate, comprising
   providing a substrate, and
   coating the substrate with the electrodepositable coating composition of claim 1.

17. The method of claim 16, wherein the substrate is a radiator.

* * * * *